UNITED STATES PATENT OFFICE.

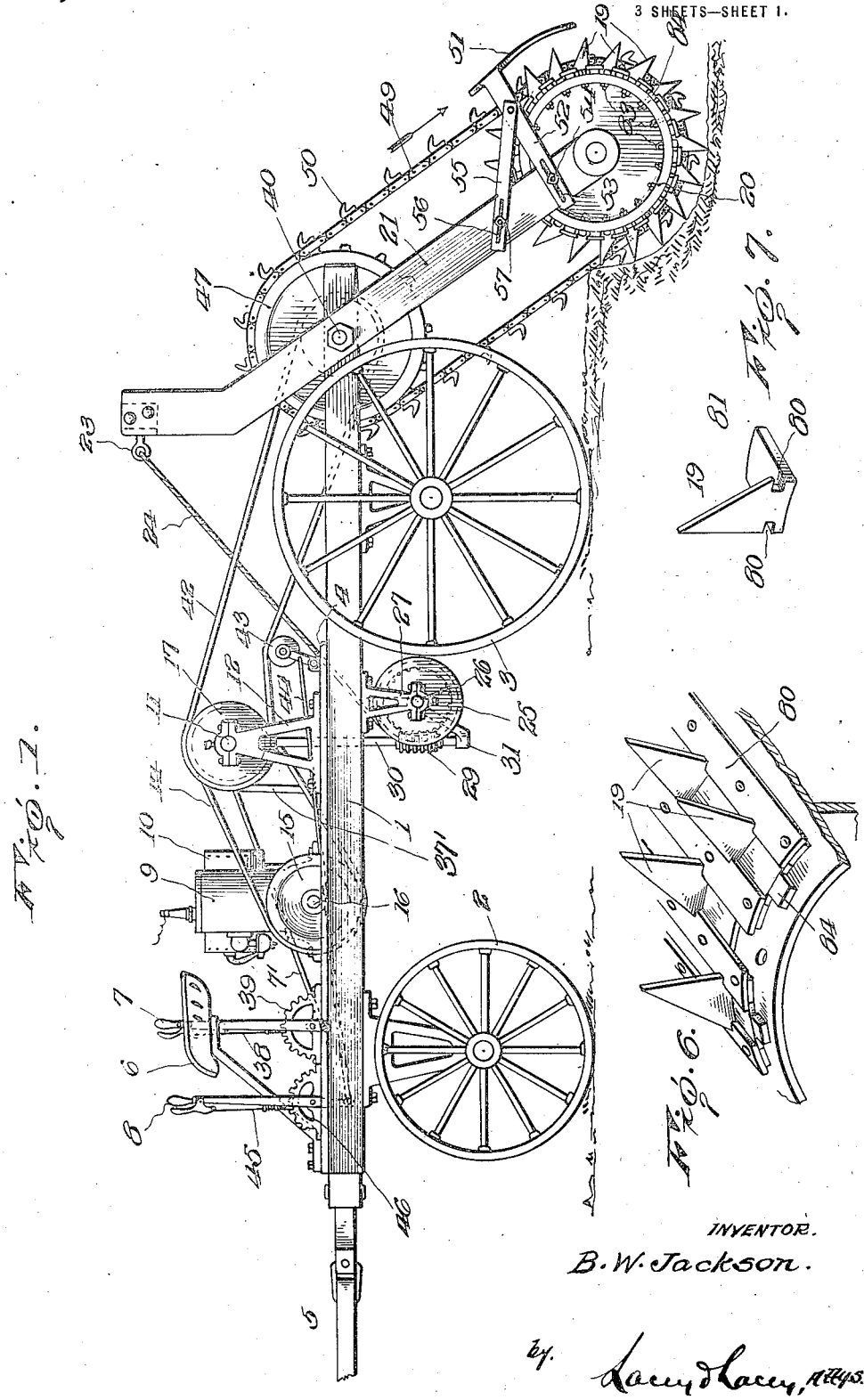

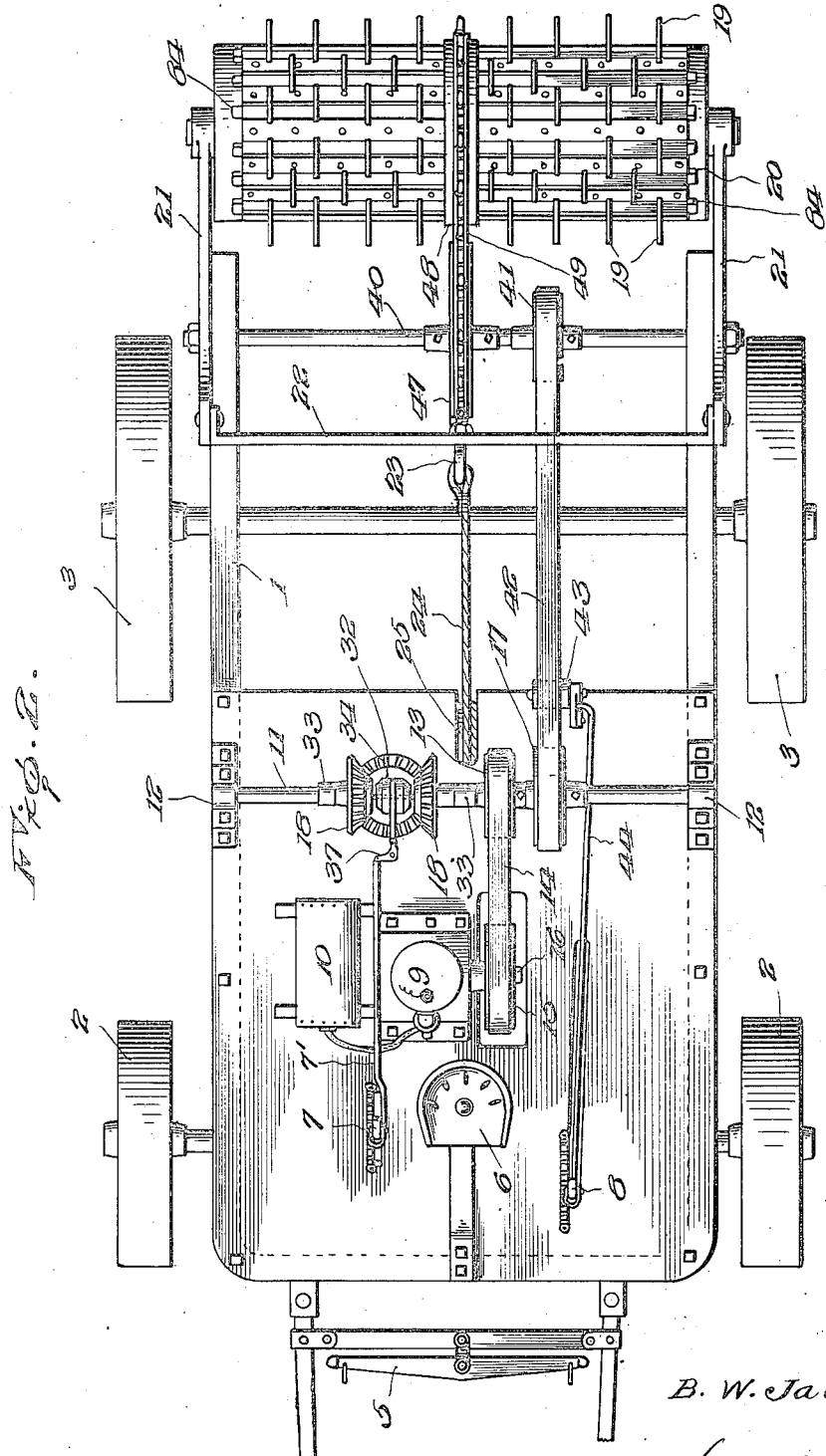

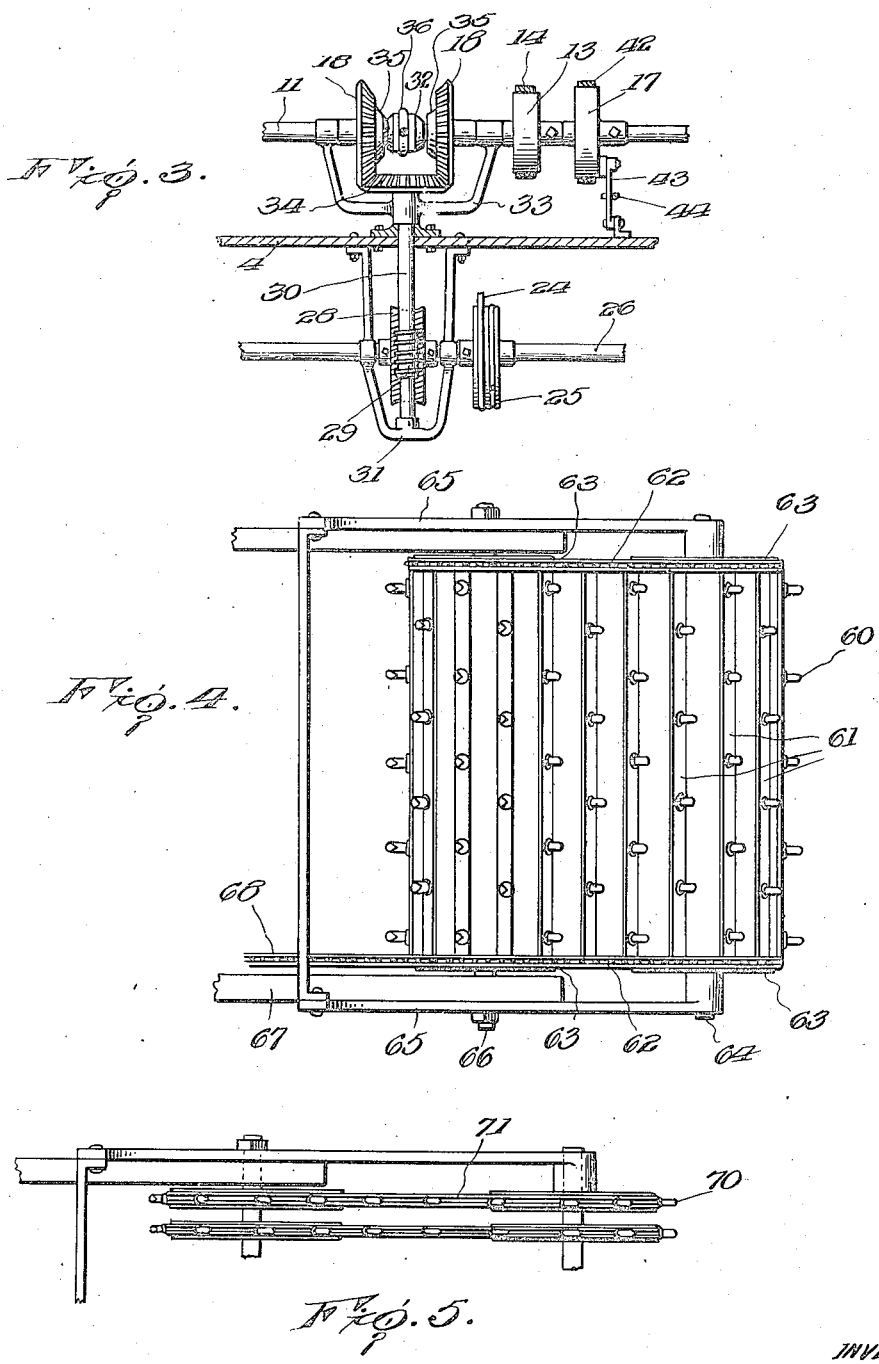

BIRNEY W. JACKSON, OF PHILADELPHIA, PENNSYLVANIA, ASSIGNOR TO THE JACKSON PLOW COMPANY, OF WILMINGTON, DELAWARE, A CORPORATION OF DELAWARE.

PLOW.

1,369,745.  Specification of Letters Patent.  Patented Feb. 22, 1921.

Application filed October 21, 1919. Serial No. 332,211.

*To all whom it may concern:*

Be it known that I, BIRNEY W. JACKSON, a citizen of the United States, residing at Philadelphia, in the county of Philadelphia and State of Pennsylvania, have invented certain new and useful Improvements in Plows, of which the following is a specification.

This invention relates to agricultural machines and has for its object the provision of means which will readily break up the ground to prepare the same for planting and which will operate continuously so as to reduce the surface soil to a finely pulverized condition. The invention seeks to provide an endless chain of ground-engaging members which will be operated by power supported on a vehicle as the vehicle is drawn over a field, a further object of the invention being to provide simple means for vertically adjusting the ground-engaging members, and a still further object being to provide means for deflecting the soil which is taken up by the said members so that it will return to the trench in rear of the members. Other incidental objects will appear in the course of the following description.

The invention is illustrated in the accompanying drawings, in which—

Figure 1 is a side elevation of a machine embodying my improvements;

Fig. 2 is a plan view of the same, the deflector being omitted;

Fig. 3 is a detail elevation of a portion of the driving mechanism;

Fig. 4 is a plan view of another form of the ground-engaging members;

Fig. 5 is a plan view of still another form of the ground-engaging members;

Fig. 6 is an enlarged view of a portion of the drum;

Fig. 7 is a detail perspective view of one of the plow teeth or shares.

In carrying out the invention, I employ a vehicle comprising a frame 1 mounted upon steering wheels 2 and rear wheels 3 and having a platform 4 extending over the greater portion of the frame. A draft device 5 is attached to the front end of the frame to permit the use of draft animals. Upon the platform is supported a seat 6 for the driver and adjacent the seat are hand levers 7 and 8 for purposes which will presently appear.

In rear of the driver's seat, I mount upon the platform a motor 9 which will preferably be an internal combustion engine, a tank 10 for the fuel being also supported upon the platform adjacent the motor. In rear of the motor, a countershaft 11 is mounted in suitable bearings or standards 12 on the platform and upon the said shaft is secured a pulley 13 which is connected by a belt 14 with the driving pulley 15 on the engine shaft 16. The countershaft 11 also has secured thereto a pulley 17 and carries the opposed loose beveled gears 18, the functions of which will presently appear.

The ground-breaking instrumentality comprises a plurality of blades or shares 19 secured, in the embodiment of the invention shown in Figs. 1 and 2, upon the surface of a drum 20 which is rotatably fitted in the lower rear ends of arms 21 which are pivotally attached to the rear ends of the frame 1. A cross bar 22 is secured to the upper ends of the arms 21 and rigidly connects the same so that a firm support for the drum 20 is provided. At the center of the cross bar 22 is an eye 23 in which is secured the rear end of a cable 24 which extends downwardly and forwardly from said eye and is secured to and adapted to wind on a drum or reel 25 which is secured upon a transverse shaft 26 below the platform, said shaft being supported in hangers 27 depending from the frame 1. Secured upon the shaft 26 adjacent the reel or drum 25 is a worm gear 28 with which meshes a worm 29 on a vertical shaft 30 which passes through the platform 4 and is journaled at its lower end in a step bearing 31 depending from the platform, the upper portion of the shaft being journaled in a bracket 33 which has branches forming bearings for an intermediate portion of the countershaft 11. A beveled gear 34 is secured upon the upper end of the shaft 30 and is constantly in mesh with the beveled gears 18 on the shaft 11, as clearly shown in Fig. 3. A clutch sleeve 32 is slidably mounted upon the shaft 11 between the gears 18 and is constrained to rotate with the said shaft, the opposite ends of the said sleeve being constructed to engage the clutch hub 35 of either gear 18 accordingly as the clutch sleeve is shifted in one or the other direction. To shift the clutch sleeve so as to effect engagement of the same with one or the other beveled gear 18 and thereby lock the engaged gear to the shaft 11, I provide a fork 36 which forms one arm of an angle lever 37 which is mounted on a post 37' rising from the platform and is connected with the lever 7 by a link 7', the said lever 7 being equipped with a latch 38 to engage a quadrant 39 whereby the lever and the clutch sleeve will be held in a set position.

The pivot 40 by which the arms 21 are attached to the rear ends of the frame 1 is preferably a shaft rotatably fitted in the frame 1 and extending across the same. A pulley 41 is secured upon the shaft 40 and is connected by a belt 42 with the pulley 17 so that when the said belt is tight and the shaft 11 is rotating the shaft 40 will also rotate and motion will be transmitted to the drum 20 and the ground-breaking members 19 mounted thereon. To maintain the belt 42 is a taut condition when it is desired to operate the ground-engaging member, I provide a belt-tightener 43 which is illustrated as a link or standard mounted for swinging movement upon the platform 4 and carrying a roller bearing against the under run of the belt. A link 44 is pivotally attached at its rear end to the swinging post or standard of the belt tightener and at its front end is pivoted to the lower end of the hand lever 8 which lever is equipped with a latch 45 adapted to engage a quadrant 46 whereby the lever and the belt tightener may be held in a set position. To transmit the motion of the shaft 40 to the drum 20, I secure upon the said shaft at the center thereof a sprocket wheel 47 and at the center of the drum 20 I provide a similar sprocket wheel 48. A chain 49 is trained around the said sprockets and this chain is equipped with ground-turning or breaking devices 50 which may or may not be duplicates of the members 19. Above the drum 20 and at the rear of the same is a deflector 51 consisting of a plate extending across the width of the machine. This plate is provided at its ends with arms 52 which extend to the supporting arms 21 and are provided with longitudinal slots 53 through which set bolts or screws 54 may be inserted into the said supporting arms 21. It will thus be seen that the deflector may be readily adjusted toward or from the said supporting arms 21 and secured in the set position. Bracing links 55 are pivoted to the side arms 52 of the deflector and are provided with longitudinal slots 56 through which set screws or bolts 57 are inserted into the supporting arms 21 at points above the locations of the set screws 54. As the bracing links 55 are disposed obliquely with respect to the side arms 52 and the supporting arms 21 it will be readily understood that as the deflector is adjusted toward or from the drum it may also be adjusted upwardly or downwardly so that it may be set at any desired point relative to the drum and secured in the set position.

The construction and arrangement of the several parts being thus made known it is thought the operation will be readily understood. The power of the motor mounted upon the platform is used for driving the ground-engaging member and also for effecting the vertical adjustment of the same. The rotation of the engine shaft will obviously be transmitted through the described belt and pulley gearing directly to the shaft 11 and from said shaft will be transmitted through the described sprocket gearing to the drum so that the drum and the chain 49 will rotate in the direction indicated by the arrow in Fig. 1 and the ground-breaking members 19 will, therefore, be caused to dig into the ground in opposition to the progress of the vehicle, the result being that the soil is thoroughly broken up and pulverized. The ground-breaking blades or shares 50 on the chain 49 will also dig into the soil so that the surface will be broken up and pulverized through the entire width of the drum 20. The loose soil taken up by the shares or blades 19 will be thrown over the drum rearwardly and tends to scatter so that the trench formed by the drum would not be closely filled and at the ends of the trench there would be a surplus of the pulverized soil at one side of the field and at the other side there would be an unfilled hole. To avoid this condition, I provide the deflector 51 which is so set that the dirt thrown rearwardly by the blades 19 will strike against said deflector and will be turned back into the trench immediately in rear of the drum so that the trench will be filled evenly throughout its length.

Normally the clutch sleeve 35 will be in a neutral position between the gears 18 so that the weight of the drum and the frame in which it is carried will hold the drum to its work. Should it be desired to raise the drum so that the machine may be moved over a road with the drum out of operation, the sleeve 35 is shifted by manipulation of the lever 7 to engage the clutch hub of the proper gear 18 whereupon the shaft 30 and the worm 29 will be rotated in such direction that the cable 24 will wind upon the reel or drum 25 and thereby cause the supporting arms 21 to swing about the shaft 40 and raise the drum from the ground. The drum may be permitted to continue its rotation, but to save wear and tear upon the parts the lever 8 will preferably be set so as to shift the belt tightener 43 rearwardly and thereby slacken the belt 42 so that the shaft will not be rotated. When the machine has reached the place where it is to be again operated, the sleeve 35 is shifted so as to engage the hub of the previously inactive gear 18 and the power of the motor will, therefore, be exerted to unwind the cable 24 from the reel or drum 25 and the carrying arms 21 will, consequently, be permitted to descend only as fast as the motor permits, the power of the motor being in this instance exerted as a brake to retard the descent of the ground-treating drum and prevent the drum and the blades thereon coming into such forcible contact with the surface of the ground as to break or otherwise damage the parts.

It will be noted that while I provide ground-breaking members which are driven directly by the transmission shaft 40, the space between the said shaft 40 and the surface of the ground is practically unobstructed so that there is nothing to turn back the dirt thrown up by the members 19. It may, however, be sometimes preferred to dispense with a drum having a closed periphery, as shown in Fig. 2, and to meet this preference, I may employ the arrangement shown in Fig. 4 in which the ground-breaking members 60, which may correspond in all respects to the members 19, are carried by transverse slats or bars 61 extending between and having their ends secured to parallel sprocket chains 62. The said slats and chains are supported by disks 63, the lower disks being carried by an axle 64 mounted in the ends of the arms 65 which correspond to the supporting arms 21 in Figs. 1 and 2. The upper disks 63 are fitted upon the shaft 66 which also constitutes the pivotal connection between the arms 65 and the main frame 67 and motion is imparted to the device by providing a sprocket wheel on the side of one of the disks 63 and connecting said sprocket wheel with the motor through a chain 68 as will be readily understood. The slats 61 are obviously spaced apart so that openings are provided through which the dirt may be thrown and, moreover, the slats will aid in breaking up and pulverizing the soil so as to quickly bring it to the proper condition for planting.

In Fig. 5 I show a form of the invention in which the slats 61 are dispensed with and the ground-breaking members 70 are carried by endless chains 71, a plurality of said chains being provided and disposed longitudinally of the machine in spaced relation. The chains are carried by upper and lower sprocket disks and the spaces between adjacent chains furnish passages through which the dirt may be thrown.

The blades or teeth 19 may be of any preferred form and secured to the drum 20 in any desired manner. In Fig. 7 I have shown a pick consisting of a blade having notches 80 in its front and rear edges near its lower end and a lateral foot 81 at its lower end, the upper surface of said foot being flush with the lower walls of said notches. On the exterior surface of the drum are T-shaped attaching ribs or strips 82 extending longitudinally of the drum, the spaces between said ribs or strips being open through the entire length of the same. The picks are slid over the drum into the spaces between the ribs so that the several feet will rest upon the drum with their edges engaging under the overhanging edges of the ribs. A bolt 83 is inserted through the shell of the drum at the end thereof in such position that the nut 84 thereon will bear against the first pick to prevent it from sliding out from between the ribs. The entire space between the adjacent ribs is then filled with the picks and another bolt 83 fitted in the opposite end of the drum to bear against the adjacent end pick. The picks in the row will be in contact, the foot of each pick bearing against the lower end of the shank or blade of the next pick except in the case of one end pick, the foot of which will bear against the adjacent nut 84. It will thus be seen that the picks may be very easily inserted or removed so that a new pick may be quickly substituted for a broken pick. The same construction may be employed in the embodiment of the invention shown in Fig. 4.

Having thus described the invention, what is claimed as new is:

1. In an agricultural machine, the combination of a vehicle, a frame mounted upon the rear end of the vehicle, a plurality of ground-breaking members supported in said frame, means on the vehicle for moving said members into engagement with the ground successively and continuously in opposition to the travel of the vehicle, and a deflector supported on said frame adjacent said ground-breaking members to return the dirt to the trench formed by said ground-breaking members, said deflector being adjustable toward and from the ground-breaking members.

2. In an agricultural machine, the combination of a vehicle, a frame mounted upon the rear end of the vehicle for pivotal movement in a vertical plane, an endless series of ground-breaking members supported in said frame, means on the vehicle for moving said members in opposition to the travel of the vehicle, and a deflector mounted on the frame above and in rear of said ground-breaking members, said deflector being movable toward and from said members and also upwardly and downwardly relative to the frame.

3. In an agricultural machine, the combination of a vehicle, a frame pivotally mounted on the rear end of the vehicle and extending above and below the same, means carried by the vehicle and connected with the upper end of said frame to pivotally adjust the same, a drum mounted in the lower end of the frame, ground-breaking members on said drum, a motor on the vehicle, a driving member mounted for rotation on the frame concentric with the pivot thereof, operative connections between said driving member and the motor, an endless flexible transmission member trained over said driving member and the drum, and ground-breaking members secured on said flexible transmission member.

4. In an agricultural machine, the combination of a vehicle, a frame mounted upon the rear end of the vehicle for pivotal movement in a vertical plane, an endless series of ground-breaking members supported in said frame, means on the vehicle for moving said members in opposition to the travel of the vehicle, a deflector disposed in rear of and above said ground-breaking members, supporting arms secured at their outer rear ends to the deflector and having their inner ends adjustably and pivotally secured to the frame, and braces secured to said supporting arms intermediate the ends thereof and extending upwardly and forwardly therefrom, the upper forward ends of said braces being adjustably and pivotally secured to the frame.

In testimony whereof I affix my signature.

BIRNEY W. JACKSON. [L. S.]